(No Model.)
R. C. TURNER.
APPARATUS FOR PURIFYING WATER OR AGING LIQUORS.
No. 524,121.
Patented Aug. 7, 1894.
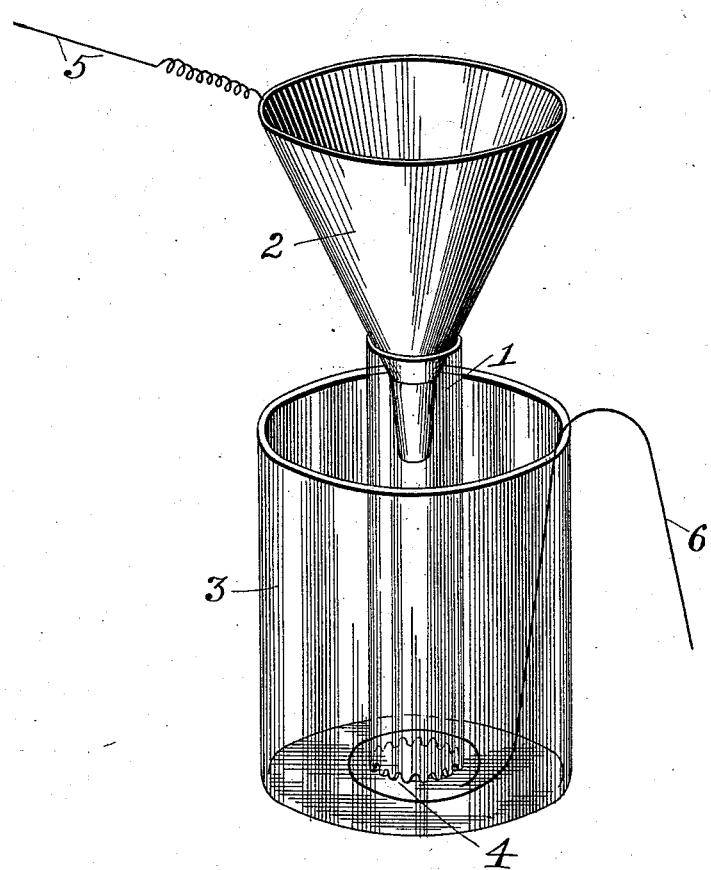
Witnesses:
Carrie E. Cowles.
A. M. Parkins.
Inventor:
Robert C. Turner
By his attys.
Rennie & Goldsborough

United States Patent Office.

ROBERT C. TURNER, OF STEUBENVILLE, OHIO.

APPARATUS FOR PURIFYING WATER OR AGING LIQUORS.

SPECIFICATION forming part of Letters Patent No. 524,121, dated August 7, 1894.

Application filed February 6, 1894. Serial No. 499,244. (No model.)

*To all whom it may concern:*

Be it known that I, ROBERT C. TURNER, a citizen of the United States, residing at Steubenville, in the county of Jefferson and State of Ohio, have invented certain new and useful Improvements in Apparatus for Purifying Water and Aging Liquors; and I do hereby declare the following to be a full, clear, and exact description of the invention, such as will enable others skilled in the art to which it appertains to make and use the same.

The usual processes for filtering water are effective only in removing such impurities as are held in mechanical suspension in the fluid, and are wholly inoperative to eliminate deleterious gases and other impurities which are in solution therein.

The object of this invention is to effect the elimination of all impurities, whether in suspension or solution; and the invention consists in a new and improved apparatus for subjecting water to electrolytic action, for the purpose of softening and purifying the same by destroying all animal life, decomposing or setting free the gases or other impurities in solution, and the precipitation of all insoluble matter held in suspension, all as hereinafter fully described and claimed.

In the accompanying drawing, forming part of this specification, the simplest form of my improved apparatus is illustrated in perspective.

Referring to the drawing, 1 denotes a tube, pipe, or conduit of any suitable length, shape, and diameter, the latter depending upon the amount of work required to be performed by the apparatus. This conduit is to be insulated, or made of a material which is a non-conductor of the electric current, such, for example, as glass or porcelain.

The numeral 2 indicates a receiver for the impure water entering the conduit, said receiver being connected with or supported upon the inlet of the conduit. The size and shape of this receiver are not material to the present invention, and I have chosen for illustration herein the simplest form of such device, consisting of a funnel-like arrangement set into the top of the conduit, and which in effect constitutes a mouth for the inlet end of the same. This receiver should be made of metal, or other good conductor of electricity, for a purpose which will appear farther on.

The outlet or discharge end of the conduit 1 depends into or is seated in a receptacle or reservoir 3 for the purified water. This vessel may be of any size and construction preferred, and may be open-topped as shown or closed. Like the conduit 1, the receptacle is to be made of insulated or non-conducting material for a reason which will be readily understood.

In the form of the invention herein illustrated, the conduit 1 is seated in, and supported by the lower end resting upon the bottom of the pure water receptacle, and the lower end of the pipe is notched, corrugated, or otherwise provided with openings 4 for the outflow of the water into the receptacle 3. If preferred, however, the pipe may be supported from the top or any other part of the vessel 3, and have its lower end arranged clear of the bottom.

The numerals 5, 5 indicate wires connected with the opposite poles of a suitable battery, dynamo, or other source of electricity. The wire 5 is attached to the inlet receptacle, which being of metal or other good conductor constitutes one of the electrodes. The wire 5ᵃ is preferably carried down to the bottom of the pure water vessel, where it is secured near the outlet end of the conduit, this end of the wire forming the opposite electrode.

The construction being as above described, the operation of the apparatus will be readily understood. Water to be treated is poured or allowed to run into the receiver 2, and being a good conductor of the electric current, especially when impure, as is well understood, completes the circuit between the two electrodes, and the current traverses the stream of water contained in the conduit. The effect of this current passing from one electrode to the other through the water is to thoroughly purify and cleanse the same, destroying all bacteria and other forms of animal life, decomposing all noxious gases, and precipitating the insoluble matter which is held in suspension. The apparatus can also be employed in like manner for aging liquors.

Having thus described my invention, what I claim, and desire to secure by Letters Patent, is—

The combination, to form an improved apparatus for purifying water by electrolytic action, of the insulated or non-conducting pipe or conduit 1, the metallic receiver 2 for impure water at the inlet end of the conduit, the insulated or non-conducting reservoir or receptacle 3 for pure water at the outlet end of the conduit, and an electric circuit, one of the poles of which is connected to the receiver 2 and the other arranged in the pure water receptacle 3; substantially as described.

In testimony whereof I affix my signature in presence of two witnesses.

ROBERT C. TURNER.

Witnesses:
 J. W. JORDAN,
 D. J. SINCLAIR.